United States Patent Office 2,862,972
Patented Dec. 2, 1958

2,862,972

THIOETHER CONDENSATION PROCESS AND PRODUCT

Hans Holtschmidt, Koln-Stammheim, and Otto Bayer, Günther Nischk, and Karl Erwin Müller, Leverkusen, Germany, assignors to Farbenfabriken Bayer Aktiengesellschaft, Leverkusen, Germany, a corporation of Germany No Drawing. Application January 23, 1957
Serial No. 635,613

Claims priority, application Germany February 8, 1956

8 Claims. (Cl. 260—609)

This invention relates generally to a method for making thioethers and more particularly to a method for making high molecular weight polythioethers without unreacted monomers undergoing ring closure reactions.

It has been proposed heretofore to prepare thioethers of relatively high molecular weight by heating a polyhydric alcohol and preferably a dihydric alcohol with a thioether glycol in the presence of a catalyst which causes splitting off of water. Products of such a reaction often have a molecular weight of about 400 to 800 and are useful as plasticizers and as lubricating oils. In some instances, the condensation has been continued until compounds of molecular weight of up to about 10,000 have been obtained, but these products have always contained compounds which impart an undesirable odor to the rather viscous or solid condensation product. This undesirable odor is caused by the presence of low molecular ethers and even monomers that tend to undergo ring closure reactions during the condensation process. For example, in the acid condensation of thiodiglycol, 1,4-thioxane is formed by the splitting off of water intramolecularly and 1,4-dithiane is frequently formed by the splitting off of 2 mols of water and 2 mols of ethylene oxide from 2 mols of thiodiglycol. These compounds impart the undesirable odor to the condensation product. Special purification processes are required to remove them as simple distillation processes are inadequate. Usually, the amount of these ring compounds formed increases as the amount of thioether glycol decreases during the condensation process.

The polyhydric alcohols, and particularly the glycols, which do not contain a sulfur atom also have a tendency to form low molecular linear or cyclic ethers by splitting off water. For example, ethylene glycol forms diethylene glycol and tetrahydrofuran is frequently formed if butanediol-1,4 is used as the polyhydric alcohol component. These intramolecular reactions of the polyhydric alcohols may be avoided at least to some extent by using a long-chain glycol, such as, for example, heptamethylene glycol, but such compounds are not readily available.

As disclosed in U. S. Patent 2,518,245, it is possible to use polyalkylene oxides such as, for example, triethylene glycol or tetraethylene glycol in the condensation process with a thioether glycol in the production of lubricating oils, but these compounds cannot be utilized to advantage in the manufacture of plastics because the resulting compounds contain a large number of ether-oxygen atoms and have the undesirable characteristic of being more hydrophilic than a similar compound in which only sulfur atoms are present as hetero atoms or oxygen-ether atoms occur only infrequently in the carbon chain.

It is therefore an object of this invention to provide an improved process for making polythioethers of high molecular weight. Another object of the invention is to provide a process for making polythioethers of high molecular weight having a large proportion of sulfur-ether bridges. Still another object of the invention is to provide a polythioether adapted for making plastics having improved water resistance characteristics. A further object of the invention is to provide a method for making thioethers which are particularly advantageous for use in making polyurethane plastics by reaction with an organic polyisocyanate.

Generally, speaking, the objects of the invention are achieved by providing a process for making polythioethers in which a glycol containing both sulfur-ether bridges and oxygen-ether bridges are condensed or such glycols are condensed with a glycol containing as ether bridges only sulfur-ether bridges. In other words, the invention provides a process for making hydrophobic polythioethers adapted for making water resistant plastics which involves the condensation of an hydroxyalkylated thioether glycol having both sulfur-ether bridges and oxygen-ether bridges either with itself or with a non-hydroxyalkylated thioether glycol containing sulfur-ether bridges. In the condensation of the two unlike glycols, it is preferred to use a ratio of 1:1 or a greater proportion of the non-hydroxyalkylated glycol in order to obtain a product having the optimum number of sulfur-ether bridges. On the other hand, the proportions of the reactants, i. e. the hydroxyalkylated thioether glycol and the non-hydroxyalkylated thioether glycol, are by no means critical in the process of the present invention. The molecular weight of the product of the condensation process must be above about 800 and preferably between about 800 and about 10,000 for it to be suitable for making plastics by further chemical reaction.

Any suitable non-hydroxyalkylated thioether glycol may be utilized as the one component, but it is preferred to use a glycol containing aliphatic groups and particularly ethylene, propylene or isopropylene groups bonded between the sulfur-ether bridges and a terminal hydroxyl group. Examples of such compounds include bis-β-hydroxyethyl sulfide, β,β'-dihydroxy-dipropyl sulfide and α,α'-dihydroxydipropyl sulfide. It is also possible to use organic compounds containing aromatic radicals, but such compounds should preferably contain one of the alkylene radicals between the sulfur-ether bridge and the terminal hydroxyl group. Examples of such compounds are

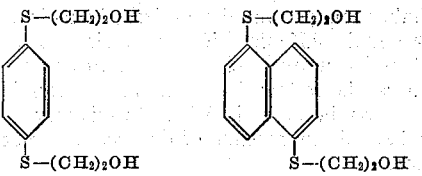

These compounds contain two sulfur bridges and are particularly advantageous because they produce a product having a large number of the desirable sulfur bridges. It is also possible to use aliphatic compounds having more than one sulfur bridge such as, for example

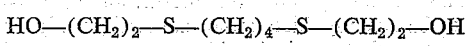

Any suitable hydroxyalkylated thioether glycol may be utilized, but it is preferred to use a glycol which has been produced by reacting one of the aforesaid thioether glycols with one or more mols of an alkylene oxide. Any suitable alkylene oxide, including cycloaliphatic alkylene oxides, may be used. For example, ethylene oxide, propylene oxide, cyclohexene oxide, trimethylene oxide and styryl oxide may be used to advantage.

It has been found that a glycol containing thioether groups can be hydroxyalkylated without using pressure by heating the reaction mixture to a temperature of above about 80° C. and using from about 0.1 to 10% and preferably from about 0.3 to about 0.5% of a strongly basic tertiary amine or quaternary ammonium base as a catalyst.

The invention thus provides a process having advantages over the prior art processes in which glycols in a caustic alkaline medium are heated to elevated temperatures and under pressure. If pressure is not utilized in the prior art process, the reaction stops at bis-β-hydroxyethyl sulfide when ethylene oxide is reacted with hydrogen sulfide and the use of such catalysts as p-toluene sulfonic acid or ferric chloride will not result in the production of compounds of high molecular weight. However, in accordance with the process of this invention, it is possible for one or any desired number of molecules of an alkylene oxide to be added to the glycol containing thioether groups and the reaction proceeds at a rapid rate. Any suitable basic tertiary or quaternary ammonium base may be utilized as the catalyst. Preferred examples include hexahydrodimethylanaline, N-alkylmorpholines, tributyl amine, pentamethyltriethylene tetramine and tribenzylammonium hydroxide.

Thioether glycols containing several added mols of an alkylene oxide per mol of glycol containing a thioether group may be utilized in practicing the invention, but it has been found that those compounds to which only one mol of an alkylene oxide is added per mol of glycol containing thioether groups and which contain an HO—R—O— group in either the beta or alpha position to the sulfur atom are of particular importance. R in the above formula must be a group of at least two carbon atoms. The addition product of one mol of ethylene oxide or of 1,2-propylene oxide with one mol of bis-β-hydroxyethyl sulfide has been found to be particularly advantageous. The non-hydroxyalkylated thioether glycol used in practicing the invention may be the same as those used for reacting with the alkylene oxide or it may be a thioether glycol in which the thioether group is connected to the hydroxyl groups by alkylene groups of relatively high molecular weight. An example of such a compound is 4,4'-dihydroxydibutyl sulfide.

The polycondensation process can be carried out by heating a substantially equimolecular mixture of the two components, with the addition of a small proportion, preferably 0.1 to 5%, of an etherification catalyst, to a temperature higher than 100° C., preferably 150° to 250° C. Depending on the proportion of catalyst, the splitting off of water is complete in from about 6 to about 12 hours. By evacuating the reaction vessel at the end of the reaction, the last traces of the water of reaction can be split off and the polycondensation can be completed. Any suitable catalyst may be utilized, including, for example, aromatic sulfonic acids and their esters, sulfuric acid and amidosulfonic acid. The progress of the condensation can be followed by constantly determining the OH number or the melt viscosity. In this way, it is possible for the molecular weight of the products to be varied as required.

It is also possible for small proportions of trihydric alcohols or alcohols with more than three hydroxy groups in the molecule to be concurrently used in the polycondensation. In this way, it is possible to obtain polyethers of varying structure and with varying degrees of branching. This process permits the production of polythioethers of sufficiently high molecular weight with practically a quantitative yield. Moreover, such a process makes it possible to produce polythioethers with a high sulfur content adapted for making plastics of improved water repellency characteristics in a simple and economical manner.

Example 1

About 1220 grams (about 10 mols) of bis-β-hydroxyethyl sulfide are mixed with about 3.7 grams of hexahydrodimethyl aniline and about 880 grams (about 20 mols) of ethylene oxide are introduced at about 120–140° C. The brownish colored product thus obtained has an OH number of about 542 (calculated 536).

About 2100 grams of this product are condensed in the presence of about 15 grams of p-toluene sulfonic acid with about 1220 grams of bis-β-hydroxyethyl sulfide at about 150–170° C. while introducing nitrogen. After the main quantity of water has been split off, the condensation is completed by applying a water jet vacuum. The product obtained after a condensation period of about 6 hours (about 2½ hours under vacuum) has an hydroxyl number of about 77. It is a yellowish brown viscous oil which is completely insoluble in water. The yield is about 91% of the theoretical.

Example 2

In the same way as described in Example 1, about 440 grams of ethylene oxide are introduced into about 1220 grams of bis-β-hydroxyethyl sulfide. A hydroxyethylation product is obtained which substantially consists of a product of the formula $HO(CH_2)_2O(CH_2)_2S(CH_2)_2OH$. By the addition of about 0.3% of p-toluene sulfonic acid and heating to about 150–170° C., this product is converted into a polythioether with the OH number of about 100, which is a yellowish brown viscous oil which is completely insoluble in water but is satisfactorily soluble in most organic solvents. The yield is about 97% of the theoretical.

Example 3

About 610 grams of the hydroxyethylated bis-β-hydroxyethyl sulfide prepared as described in Example 1 are condensed with about 134 grams of trimethylolpropane and about 732 grams of of bis-β-hydroxyethyl sulfide with the addition of about 0.4% of p-toluene sulfonic acid. A branched polythioether with the OH number of about 187 is obtained as a yellowish brown water-insoluble viscous oil with a yield of about 92%.

The condensation product having a molecular weight of above about 800 has a large percentage by weight of sulfur atoms in the form of sulfur-ether bridges and is particularly advantageous for making plastics by further chemical reaction. A preferred process for making plastics involves the reaction of the thioether glycol condensation product of this invention with an organic polyisocyanate such as, for example, toluylene diisocyanate, hexamethylene diisocyanate, p,p'-diphenylmethane diisocyanate, or other diisocyanate, such as is disclosed in our co-pending application Serial No. 589,586, filed June 6, 1956, of which this application is a continuation-in-part. If a cellular product is desired, water is employed which reacts with isocyanates to form carbon dioxide which, in turn, acts as a blowing agent. The condensation product of this invention may be mixed with the polyisocyanate and catalyst in accordance with any suitable process, but preferably the mixing is brought about in accordance with the process disclosed in U. S. Patent 2,764,565 and in apparatus of the type disclosed therein. The final product resulting from the reaction of the thioether glycol condensation product with a polyisocyanate has many uses including use as a carpet underlay, padding in cushions or pillows, insulation in refrigerators or in clothing, or, if a rubber-like material is made, the product may be utilized for making automobile tires, bearings, and other commercially important fabrications.

Unless stated otherwise in the claims, the term "thioether glycol" is intended to include both hydroxyalkylated thioether glycols and non-hydroxyalkylated thioether glycols.

The invention has been described in considerable detail in the foregoing in order to properly illustrate the invention, but it is to be understood that the purpose of such detail is solely to illustrate the embodiments of the invention and that modifications can be made by those skilled in the art without departing from the spirit or scope of the invention except as is set forth in the claims.

What is claimed is:

1. A method for making hydroxy polythioethers having sulfur-ether bridges, comprising mixing an hydroxyalkylated thioether glycol with a thioether glycol and heating the resulting mixture to a temperature of at least about 100° C. to effect condensation of the hydroxyl groups of said glycols with the accompanying release of water and linkage of the glycols together.

2. A method for making hydroxy polythioethers, comprising mixing an hydroxyalkylated thioether glycol having at least two carbon atoms between each hydroxyl group and each hetero oxygen atom with a thioether glycol having sulfur-ether bridges as the only ether bridges in its chain and heating the resulting mixture to a temperature of at least about 100° C. to effect condensation of the hydroxyl groups of said glycols with accompanying release of water and linkage of the glycols together until a product having a molecular weight of at least about 800 is obtained.

3. A method for making polythioethers, comprising heating to a temperature of at least about 100° C. molecules of an hydroxyalkylated thioether glycol to form a product having a molecular weight of above about 800.

4. A method for making hydroxy polythioethers, comprising mixing an hydroxyalkylated thioether glycol with a glycol selected from the group consisting of an hydroxyalkylated thioether glycol and a thioether glycol containing only sulfur-ether bridges as ether bridges and heating the resulting mixture to a temperature of at least about 100° C. to effect condensation of the hydroxyl groups of said glycols with accompanying release of water and linkage of the glycols together.

5. A polythioether having terminal hydroxyl groups and a molecular weight of above about 800 adapted for making polyurethane plastics of improved hydrophobic characteristics having units of the configuration $$\{-O-R-(S-R)_n-O-(R-S)_n-R-O-R-O-\}$$

wherein R is a divalent organic radical and $n$ is an integer less than 3.

6. The product of claim 5 wherein R is an alkylene radical.

7. The product of a reaction between an hydroxyalkylated thioether glycol and a thioether glycol, said product having a molecular weight of at least about 800.

8. The product of a reaction between an hydroxyalkylated thioether glycol and a thioether glycol having sulfur-ether bridges as the only ether bridges, said product having a molecular weight of at least 800.

No references cited.